No. 740,123. PATENTED SEPT. 29, 1903.
M. GROSS.
BABY CARRIAGE.
APPLICATION FILED JULY 7, 1903.
NO MODEL. 2 SHEETS—SHEET 1.
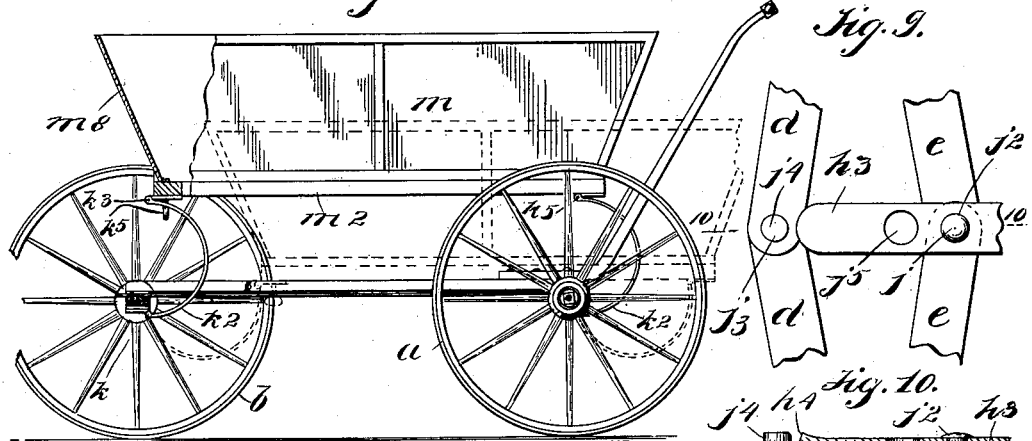
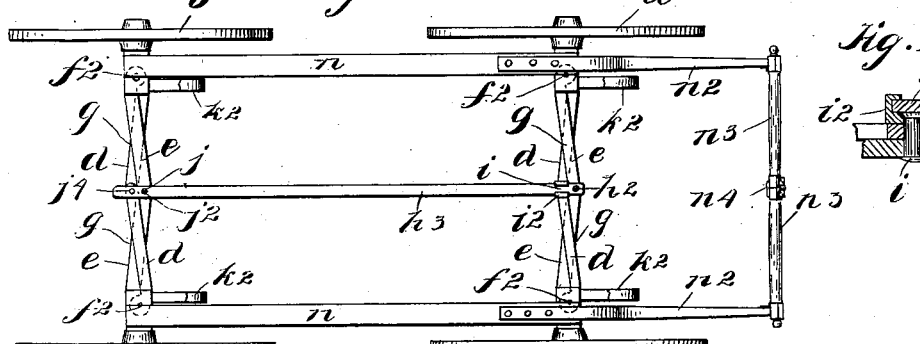
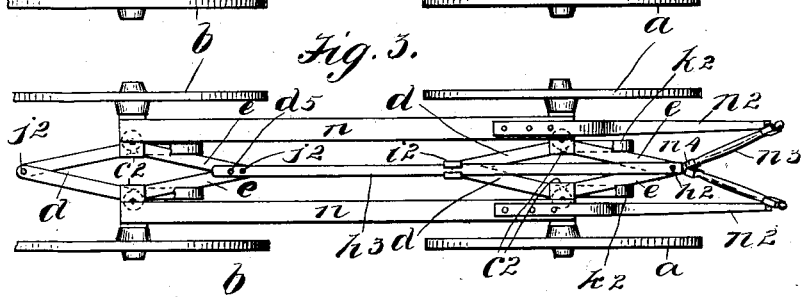
WITNESSES
F. A. Stewart
C. E. Mulreany
INVENTOR
Max Gross
BY Edgar Tate & Co
ATTORNEYS No. 740,123. PATENTED SEPT. 29, 1903.
M. GROSS.
BABY CARRIAGE.
APPLICATION FILED JULY 7, 1903.
NO MODEL. 2 SHEETS—SHEET 2.
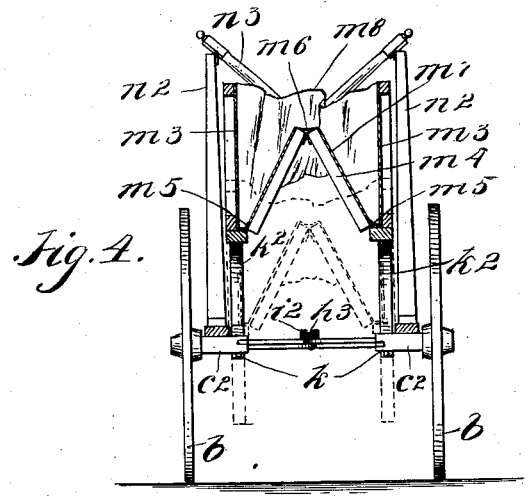
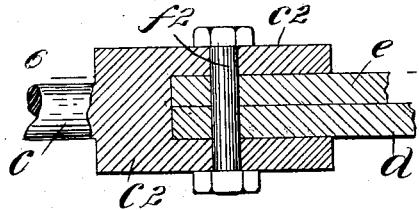
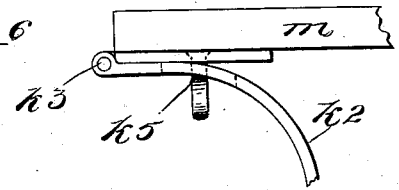
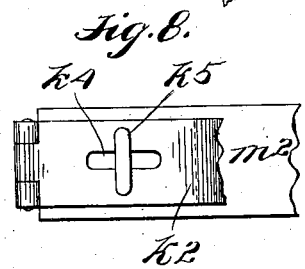
WITNESSES
F. A. Stewart
E. E. Mulreany
INVENTOR
Max Gross
BY Edgar Tate & Co
ATTORNEYS No. 740,123.                                           Patented September 29, 1903.

UNITED STATES PATENT OFFICE.

MAX GROSS, OF NEW YORK, N. Y., ASSIGNOR OF ONE-HALF TO IGNATZ STEINWITZ, OF NEW YORK, N. Y.

BABY-CARRIAGE.

SPECIFICATION forming part of Letters Patent No. 740,123, dated September 29, 1903.

Application filed July 7, 1903. Serial No. 164,535. (No model.)

*To all whom it may concern:*

Be it known that I, MAX GROSS, a citizen of Austria-Hungary, residing at New York, in the county of New York and State of New York, have invented certain new and useful Improvements in Baby-Carriages and Similar Vehicles, of which the following is a specification, such as will enable those skilled in the art to which it appertains to make and use the same.

This invention relates to baby-carriages and other similar vehicles of this class, and the object thereof is to provide a vehicle of this class of improved construction and in which the bed or body is supported in a raised position by springs and adapted to be lowered so as to rest on the running-gear, the side portions of the vehicle being also adapted to be folded compactly together in either position of the bed or body, a further object being to provide a vehicle of the class specified which is simple in construction and strong and durable; and with these and other objects in view the invention consists in a baby-carriage or similar vehicle constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of a baby-carriage made according to my invention, the bed or body being shown in a raised position in full lines and in a lowered position in dotted lines; Fig. 2, a plan view with the bed or body removed and showing the running-gear only; Fig. 3, a view similar to Fig. 2, but showing the sides of the running-gear folded together; Fig. 4, a sectional end view of the complete vehicle, including the bed or body, and showing the same partly folded, the bed or body being shown in a raised poisition in full lines and indicated in a lowered position in dotted lines; Fig. 5, a sectional side view of the end of one of the spindles; Fig. 6, a section thereof on the line 6 6; Fig. 7, a side view of one of the bottom side rails of the bed or body and showing one of the springs by which the bed or body is supported; Fig. 8, a bottom plan view thereof; Fig. 9, a plan view of parts of the running-gear; Fig. 10, a section thereof on the line 10 10, and Fig. 11 a sectional view of a detail of the construction of the running-gear.

In the practice of my invention I provide a vehicle of the class specified having the usual front wheels $a$ and rear wheels $b$, and these wheels are mounted on spindles $c$, having an oblong head $c^2$, and said spindle and the head thereof are clearly shown in Figs. 5 and 6. The spindles of the front wheels $a$ and rear wheels $b$ are connected transversely by two sets of link members $d$ and $e$, which are pivotally connected with the spindle-heads, as shown in Figs. 5 and 6, the spindle-heads being provided with transverse recesses $c^3$ and the link members $d$ and $e$ with circular heads $f$, which are pivoted in said recesses by means of a bolt or similar device $f^2$, and the heads $f$ of the link members $d$ and $e$ are provided with projections $f^3$, which abut against corresponding shoulders $f^4$, with which the heads $c^2$ of the spindles $c$ are provided and which serve to limit the movement of the link members $d$ and $e$ in one direction.

The link members $d$ and $e$ are composed of two separate parts pivotally connected midway of the longitudinal center of the running-gear of the vehicle, and said separate parts of the link members $d$ and $e$ are overlapped, as shown at $g$, and pivotally connected with the separate parts of the link members $d$, by which the front spindles are connected, as shown at $h^2$, is a spring-metal bar $h^3$, which extends backwardly across the link members $d$ and $e$, by which the spindles of the rear wheels $b$ are connected.

The separate parts of the link members $d$, by which the spindles of the front wheels $a$ are connected, are pivotally connected, as shown at $i$ in Fig. 11, and connected with the upper end of the pivot member $i$ is a keeper $i^2$, through which the spring-metal bar $h^3$ passes. The separate parts of the link members $e$, by which the spindles of the rear wheels $b$ are connected, are also pivotally connected at their inner ends by a pivot-pin $j$, which is adapted to pass through a corresponding hole $j^2$ in the spring-metal bar $h^3$, and the separate parts of the link members $d$, by which the spindles of the rear wheels $b$ are connected, are also pivotally connected by a pivot-pin $j^3$, having a head member $j^4$, adapted to pass through a corresponding opening $j^5$ in the spring-metal bar $h^3$, this construction being clearly shown in Figs. 2, 9, and 10, and the rear end of the spring-metal bar $h^3$ is preferably bent up slightly, as shown at $h^4$ in Fig. 10.

Hinged to the bottom of the inner ends of the heads $c^2$ of the spindles $c$, as shown at $k$ in Figs. 1 and 4, are curved springs $k^2$, all of which are directed forwardly, upwardly, and backwardly, and the other ends of these springs are hinged to the bottom side bars $m^2$ of the bed or body $m$, as clearly shown at $k^3$, and as thus supported the bed or body may be held in an elevated or raised position, as shown in full lines in Fig. 1, or it may be lowered onto the running-gear, as shown in dotted lines in said figure. One or both of the springs $k^2$, which are connected with the spindle-heads of the rear wheels $b$ in the form of construction shown, are provided with a slot $k^4$, and secured in the corresponding end or ends of the side bars $m^2$ of the bed or body are headed pins $k^5$, the head or heads of which are adapted to be passed through the slot or slots $k^4$ and to be turned at right angles thereto, as shown in Figs. 7 and 8, in order to hold the bed or body in its raised position, and whenever it is desired to lower said bed or body the headed pin or pins $k^5$ are turned so that they will pass through the slot or slots $k^4$.

The heads $c^2$ of the spindles $c$ are also rigidly connected at each side of the vehicle by horizontal and parallel bars $n$, and secured to the front ends thereof are upwardly and forwardly directed arms $n^2$, the forward upper ends of which are connected by a transverse handle-piece $n^3$, hinged thereto and composed of two separate parts hinged together at $n^4$, so as to fold downwardly when the side portions of the vehicle are folded together.

The bed or body $m$ of the vehicle in the form of construction shown is composed of side members having flexible panels $m^3$ and transverse members $m^4$, hinged to the side bars $m^2$ at $m^5$, said transverse members being composed of separate parts hinged together centrally, as shown at $m^6$, and said transverse members $m^4$ are also preferably connected by flexible bottom parts $m^7$, of canvas, rubber, or other suitable material, and the end portions $m^8$ of the bed or body are also composed of suitable flexible material, and as thus constructed the bed or body portion $m$ or the sides thereof may also be folded together, as indicated in Fig. 4.

My invention is in no way limited to the construction of the bed or body portion of the vehicle or the material thereof, as any suitable material may be employed, all that is necessary in this connection being that the construction of the bed or body be such that the side portions thereof will fold together when the side portions of the running-gear are folded together in the manner herein described.

It will be understood, of course, that the link-connecting devices $d$ and $e$ constitute toggle-levers, which are held in operative position, as shown in Fig. 2, by the spring-metal bar $h^3$, and whenever it is desired to fold the sides of the vehicle together, as hereinbefore described, the rear end of said bar is disconnected from the pin $j^3$ or the head $j^4$ thereof, and in this position of the parts the inner ends of the separate parts of the link-connecting device $e$ will move forwardly, while the corresponding ends of the separate parts of the link-connecting device $d$ will move backwardly, as shown in Fig. 3, and by means of this construction the sides of the running-gear may be easily and conveniently locked in operative position whenever desired or unlocked and folded together, as shown in Fig. 3, in which position the entire vehicle may be folded into a compact form and will occupy but little space when not in use.

Having fully described my invention, what I claim as new, and desire to secure by Letters Patent, is—

1. A vehicle of the class described, the wheels of which are mounted on spindles having oblong inner ends or heads, link members by which the spindles of the front wheels and the spindles of the rear wheels are connected, said link members being composed of separate parts pivotally connected at their inner ends and also pivotally connected with the heads of the spindles and adapted to operate as toggle-levers, the separate parts of the link members being also crossed, and a spring-metal bar pivotally connected with the inner ends of one of the link members at one end of the vehicle and passed through a keeper connected with the inner ends of the other link member at said end of the vehicle, said bar being also pivotally connected with the inner ends of the separate parts of one of the link members at the opposite end of the vehicle and adapted to be detachably connected with the inner ends of the separate parts of the other link member at said end of the vehicle, substantially as shown and described.

2. A vehicle of the class described, the wheels of which are mounted on spindles having oblong inner ends or heads, link members by which the spindles of the front wheels and the spindles of the rear wheels are connected, said link members being composed of separate parts pivotally connected at their inner ends and also pivotally connected with the heads of the spindles and adapted to operate as toggle-levers, the separate parts of the link members being also crossed, and a spring-metal bar pivotally connected with the inner ends of one of the link members at one end of the vehicle and passed through a keeper connected with the inner ends of the other link member at said end of the vehicle, said bar being also pivotally connected with the inner ends of the separate parts of one of the link members at the opposite end of the vehicle and adapted to be detachably connected with the inner ends of the separate parts of the other link member at said end of the vehicle, the said heads of the said spindles being also connected at each side by rigid side bars, substantially as shown and described.

3. A vehicle of the class described, the wheels of which are mounted on spindles having oblong inner ends or heads, link members by which the spindles of the front wheels and the spindles of the rear wheels are connected, said link members being composed of separate parts pivotally connected at their inner ends and also pivotally connected with the heads of the spindles and adapted to operate as toggle-levers, the separate parts of the link members being also crossed, and a spring-metal bar pivotally connected with the inner ends of one of the link members at one end of the vehicle and passed through a keeper connected with the inner ends of the other link member at said end of the vehicle, said bar being also pivotally connected with the inner ends of the separate parts of one of the link members at the opposite end of the vehicle and adapted to be detachably connected with the inner ends of the separate parts of the other link member at said end of the vehicle, the said heads of the said spindles being also connected at each side by rigid side bars, and said side bars being provided at one end with handle-arms which are secured thereto and connected by a handle-bar hinged thereto and also composed of two parts hinged together at the middle, substantially as shown and described.

4. A vehicle of the class described, the wheels of which are mounted on spindles having oblong inner ends or heads, link members by which the spindles of the front wheels and the spindles of the rear wheels are connected, said link members being composed of separate parts pivotally connected at their inner ends and also pivotally connected with the heads of the spindles and adapted to operate as toggle-levers, the separate parts of the link members being also crossed, and a spring-metal bar pivotally connected with the inner ends of one of the link members at one end of the vehicle and passed through a keeper connected with the inner ends of the other link member at said end of the vehicle, said bar being also pivotally connected with the inner ends of the separate parts of one of the link members at the opposite end of the vehicle and adapted to be detachably connected with the inner ends of the separate parts of the other link member at said end of the vehicle, the said heads of said spindles being also connected at each side by rigid side bars, and said side bars being provided at one end with handle-arms which are secured thereto and connected by a handle-bar hinged thereto and also composed of two parts hinged together at the middle, the said running-gear being also provided with a bed or body, the side portions of which are adapted to be folded together, substantially as shown and described.

In testimony that I claim the foregoing as my invention I have signed my name, in presence of the subscribing witnesses, this 6th day of July, 1903.

MAX GROSS.

Witnesses:
F. A. STEWART,
C. E. MULREANY.